United States Patent
Kobayashi

(10) Patent No.: US 6,752,508 B2
(45) Date of Patent: Jun. 22, 2004

(54) HEADLAMP SYSTEM FOR VEHICLE

(75) Inventor: Shoji Kobayashi, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/212,081

(22) Filed: Aug. 6, 2002

(65) Prior Publication Data

US 2003/0031008 A1 Feb. 13, 2003

(30) Foreign Application Priority Data

Aug. 8, 2001 (JP) .................................. P.2001-240521

(51) Int. Cl.$^7$ .............................................. B60Q 1/12
(52) U.S. Cl. ...................... 362/37; 362/465; 362/466
(58) Field of Search ................................ 362/465, 466, 362/37, 64; 313/77, 81

(56) References Cited

U.S. PATENT DOCUMENTS

| | | | |
|---|---|---|---|
| 5,562,336 A | * 10/1996 | Gotou | 362/466 |
| 6,049,749 A | 4/2000 | Kobayashi | |
| 6,343,869 B1 | 2/2002 | Kobayashi | |

FOREIGN PATENT DOCUMENTS

| | | |
|---|---|---|
| GB | 2 355 869 | 2/2001 |
| JP | 8-192674 | 7/1996 |
| JP | 2002-52974 | 2/2002 |
| JP | 2002-52975 | 2/2002 |

* cited by examiner

*Primary Examiner*—Sandra O'Shea
*Assistant Examiner*—Guiyoung Lee
(74) *Attorney, Agent, or Firm*—Sughrue Mion, PLLC

(57) ABSTRACT

In such a state that a self-vehicle runs along a guide route (YES in S6), if an intersection is not present in a forward part for a while (NO in S8), beam control is carried out in a navigation associating mode corresponding to the guide route (S9). Consequently, beam irradiation is properly carried out over a road provided ahead of the vehicle without requiring a complicated calculation for the beam control. On the other hand, if the intersection is present in the forward part of the guide route (YES in S8), the beam control is carried out in a normal mode (a control mode other than the navigation associating mode) (S10). Consequently, even if the self-vehicle gets out of the guide route when passing through the intersection, the beam control itself is performed continuously and the beam irradiation is properly executed over the road provided ahead of the vehicle.

6 Claims, 13 Drawing Sheets

NAVIGATION ASSOCIATING MODE

ROAD FOLLOWING CONTROL MODE

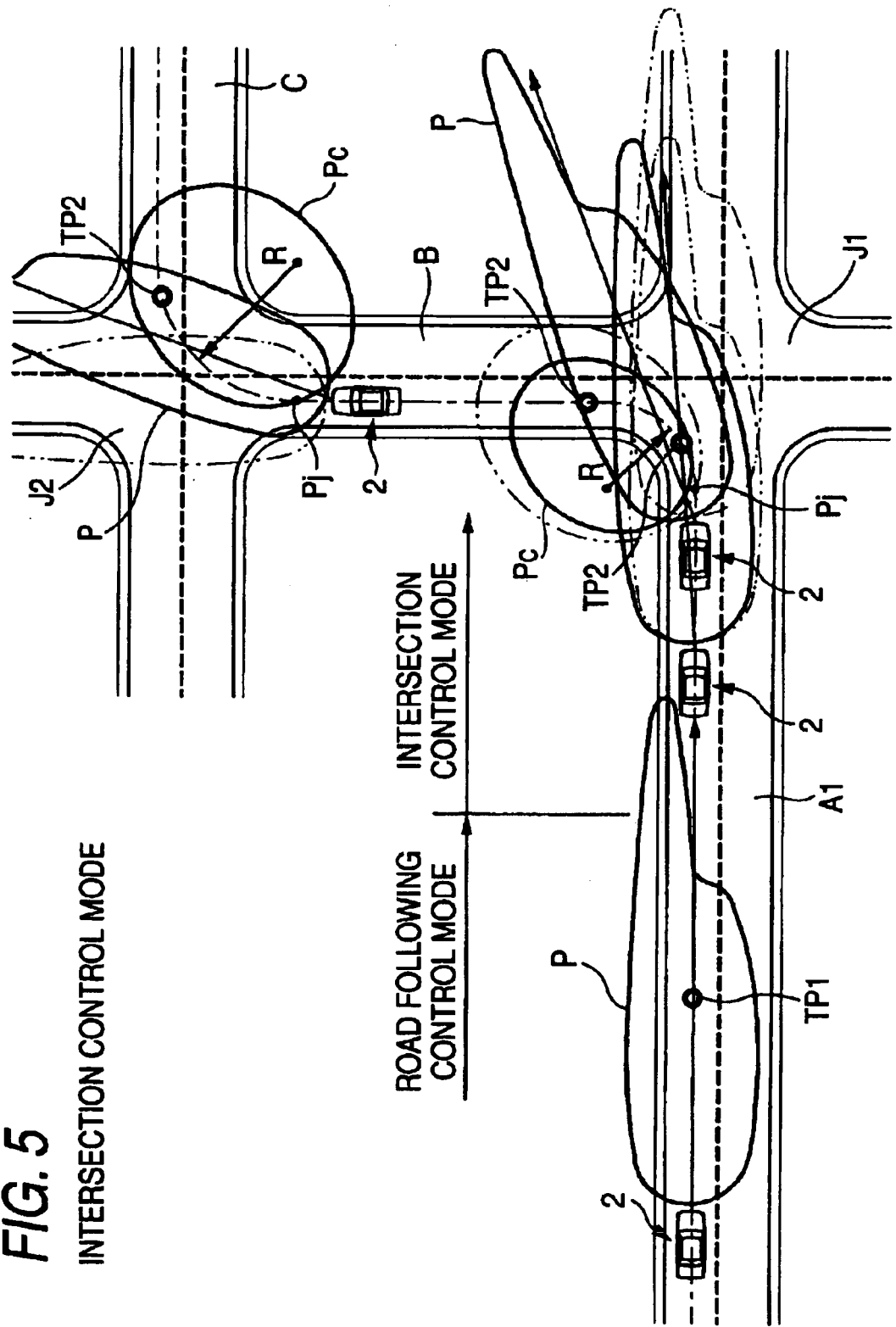
FIG. 5 INTERSECTION CONTROL MODE

TURNING ANGLE CORRESPONDING MODE
(AT TIME OF LEFT TURN)

TURNING ANGLE CORRESPONDING MODE
(AT TIME OF RIGHT TURN)

<SPECIFIC EXAMPLE OF BEAM CONTROL>
GUIDE ROUTE: STRAIGHT ADVANCE
ACTUAL RUNNING ROUTE: LEFT TURN

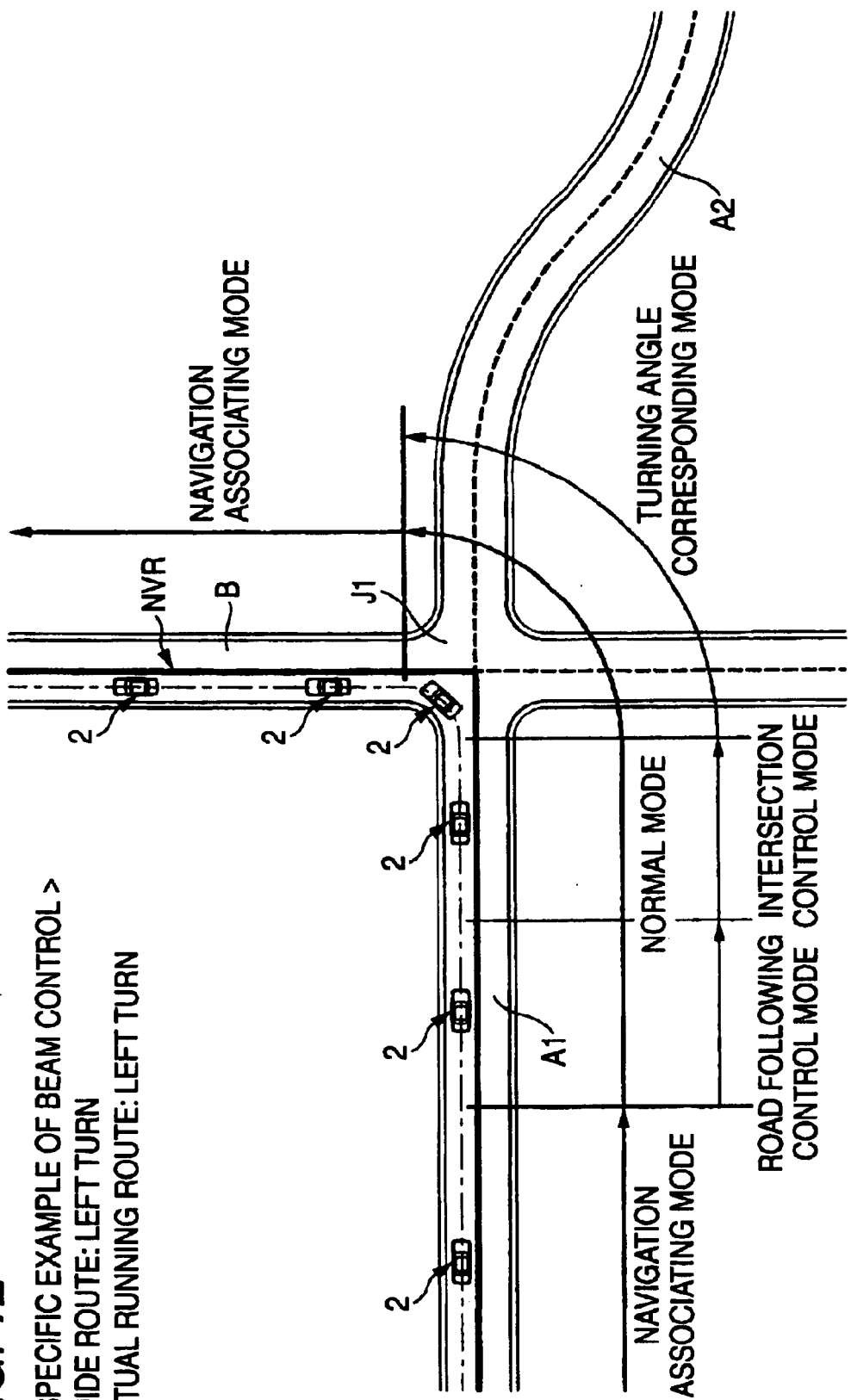

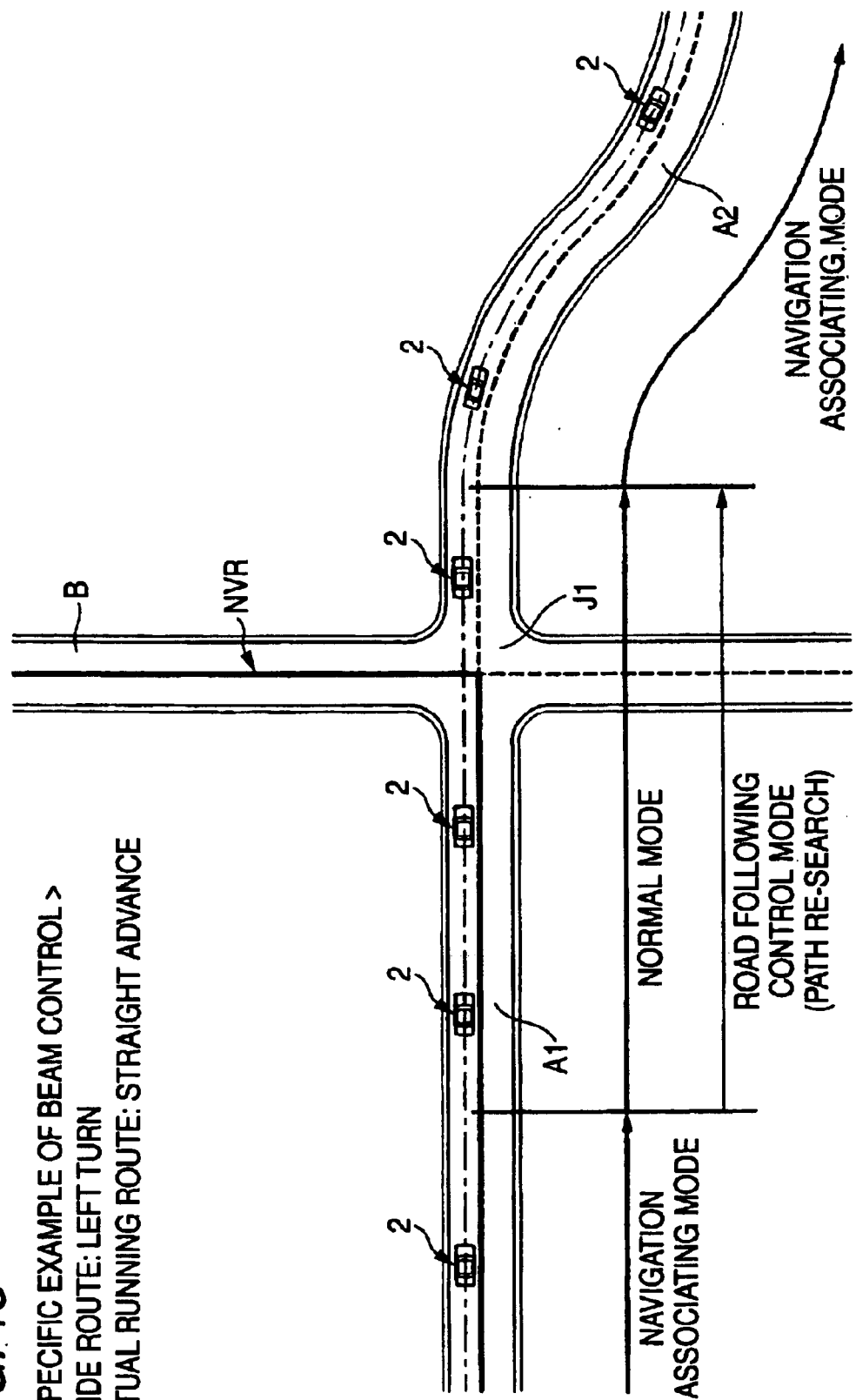

HEADLAMP SYSTEM FOR VEHICLE

The present invention relates to a headlamp system for a vehicle which is constituted to carry out beam control for a headlamp.

In an ordinary headlamp for a vehicle, a beam irradiation direction thereof is fixed. Therefore, a road provided ahead of the vehicle cannot be sufficiently irradiated during running on a curved road such as a mountain road or an intersection.

On the other hand, JP-A-8-192674 has disclosed a headlamp system for a vehicle in which beam irradiation is carried out toward a road provided ahead of a vehicle in a curving advance direction when a turn signal lamp is operated or a steering operation is performed, thereby enhancing a visibility during the running on the curved road.

Moreover, the shape of the road provided ahead of the vehicle is detected by means of a CCD camera. If beam control is carried out corresponding to the result of the detection, it is possible to more properly carry out the beam irradiation on the road provided ahead of the vehicle.

In a vehicle comprising a navigation device, furthermore, it is also possible to carry out the beam control for a headlamp by utilizing a route guidance function. The route guidance function is a function of setting a guide route from a current self-vehicle position to a running destination and providing information required for a driver in an image or a voice according to the guide route. If the beam control corresponding to the guide route is thus carried out, it is possible to properly perform the beam irradiation over the road provided ahead of the vehicle without requiring a complicated calculation as compared with the case in which the beam control corresponding to the result of detection of the shape of the road provided ahead of the vehicle is to be executed.

In the case in which the beam control for the headlamp is to be thus carried out by utilizing the route guidance function, however, the following problem arises.

More specifically, even if the self-vehicle runs along the guide route at the present time, it does not always run continuously along the guide route but gets out of the guide route in some cases. In those cases, usually, the guide route is re-searched by a navigation device. However, there is a problem in that proper beam control cannot be carried out until the re-search is completed and a new guide route is set.

SUMMARY OF THE INVENTION

The invention has been made in consideration of such circumstances and has an object to provide a headlamp system for a vehicle constituted to carry out the beam control for a headlamp in which beam control utilizing the route guidance function of a navigation device can be performed, and furthermore, predetermined beam control can be executed also in the case in which a self-vehicle gets out of a guide route.

The invention attains the object by devising the beam control when a self-vehicle comes to an intersection in consideration of the fact that the self-vehicle generally gets out of a guide route when passing through the intersection.

More specifically, the invention provides a headlamp system for a vehicle comprising a headlamp for irradiating a forward part of the vehicle, beam control means for controlling a beam irradiated by the headlamp, and a navigation device constituted to set a guide route from a current self-vehicle position to a running destination, wherein, in such a state that a self-vehicle runs along the guide route, the beam control means carries out the beam control in a navigation associating mode corresponding to the guide route if an intersection is not present between the current self-vehicle position and a position that the self-vehicle is to reach after a predetermined time in the guide route, and carries out the beam control in a control mode other than the navigation associating mode until the self-vehicle passes through at least an intersection present before the position that the self-vehicle is to reach if any.

The specific contents of the beam control to be carried out by the "beam control means" are not particularly restricted but it is possible to employ control in which the irradiation direction, range or amount of a beam to be irradiated from the headlamp or their proper combination is variable, for example.

If the "intersection" is a point in which three or more roads merge, a configuration thereof is not particularly restricted but may be an intersection of a crossroad, a T-shaped road or a five-forked road or may be a Y-shaped diverging point or merging point.

The specific contents of the "control mode other than the navigation associating mode" are not particularly restricted but it is possible to employ a road shape corresponding mode for carrying out beam control corresponding to the shape of the road provided ahead of the vehicle or a turning angle corresponding mode for carrying out beam control corresponding to a vehicle turning angle, for example.

As shown in the structure, the headlamp system for a vehicle according to the invention comprises the beam control means for controlling a beam irradiated by the headlamp and the navigation device having a route guidance function. In such a state that the self-vehicle runs along the guide route, the beam control means carries out the beam control in the navigation associating mode corresponding to the guide route in the case in which an intersection is not present between the current self-vehicle position and the position that the self-vehicle is to reach after a predetermined time in the guide route, while it carries out the beam control in the control mode other than the navigation associating mode until the self-vehicle passes through at least the intersection in the case in which the intersection is present before the position that the self-vehicle is to reach. Therefore, the following functions and effects can be obtained.

More specifically, when the self-vehicle runs along the guide route, the beam control is carried out in the navigation associating mode if the intersection is not present in a forward part over the guide route for awhile. Therefore, it is possible to properly carry out beam irradiation over the road provided ahead of the vehicle without requiring a complicated calculation for the beam control (without applying a great burden to the beam control means). On the other hand, when the self-vehicle runs along the guide route, the beam control is carried out in the control mode other than the navigation associating mode if the intersection is present ahead of the vehicle. Therefore, even if the self-vehicle gets out of the guide route when passing through the intersection, the beam control itself is carried out continuously. Consequently, it is possible to properly carry out the beam irradiation over the road provided ahead of the vehicle.

According to the invention, thus, the beam control utilizing the route guidance function of the navigation device can be carried out, and furthermore, predetermined beam control can be performed also in the case in which the self-vehicle gets out of the guide route in the headlamp system for a vehicle which is constituted to execute the beam control for the headlamp.

With the structure described above, if the self-vehicle gets out of the guide route when passing through the intersection in such a state as to run along the guide route, the beam control is carried out in the control mode other than the navigation associating mode until the guide route is re-searched by the navigation device and a new guide route is set, and the beam control is carried out in the navigation associating mode after the new guide route is set. Thus, proper beam control can be carried out continuously, and furthermore, the beam control can be performed in the navigation associating mode as much as possible. Consequently, it is possible to relieve the burden of the beam control means.

The specific contents of the "control mode other than the navigation associating mode" are not particularly restricted as described above. With such a structure as to include the road shape corresponding mode for carrying out the beam control corresponding to the shape of the road provided ahead of the vehicle, also in the case in which the self-vehicle gets out of the guide route, it is possible to properly perform the beam irradiation over the road provided ahead of the vehicle in almost the same precision as the beam control in the navigation associating mode.

The specific contents of the "beam control in the navigation associating mode" are not particularly restricted. With such a structure that the position that the self-vehicle is to reach after a predetermined time in the guide route is set to be a target position, the road provided ahead of the vehicle can be irradiated sufficiently.

BRIEF DESCRIPTION OF THE DRAWINGS

FIG. 5 is a plan view showing a road according to a specific example of beam control to be carried out in an intersection control mode to be the normal mode in the embodiment;

FIG. 12 is a plan view showing a road according to a specific example of the beam control to be carried out in the embodiment (No. 3); and FIG. 13 is a plan view showing a road according to a specific example of the beam control to be carried out in the embodiment (No. 4).

DETAILED DESCRIPTION OF THE PREFERRED EMBODIMENTS

An embodiment of the invention will be described below with reference to the drawings.

Figure 1:
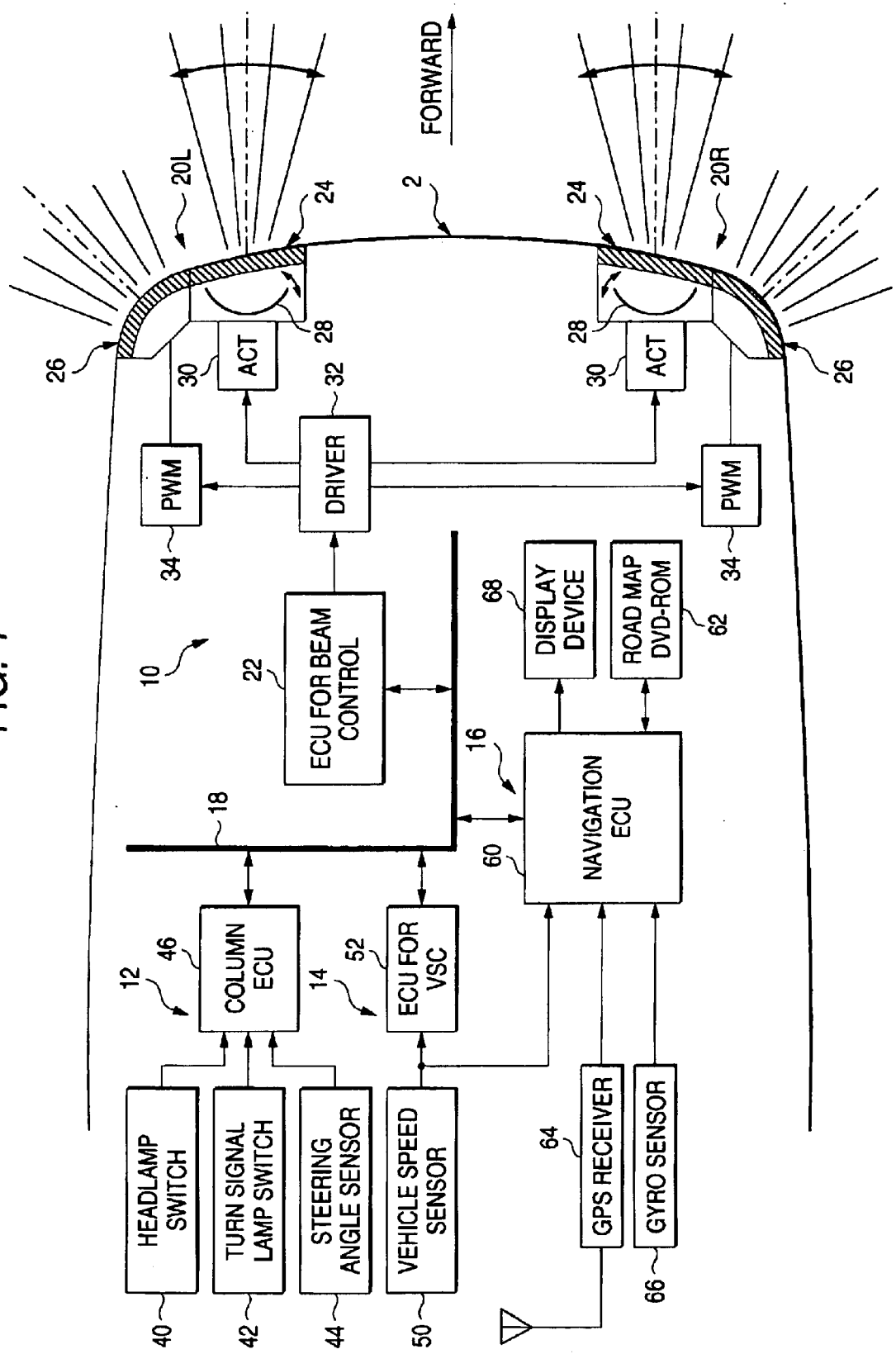
FIG. 1 is view showing the whole structure of a headlamp system for a vehicle according to an embodiment of the invention.

FIG. 1 is a view showing the whole structure of a headlamp system for a vehicle according to an embodiment of the invention.

As shown, the headlamp system for a vehicle comprises a headlamp device 10, a column device 12, a VSC (vehicle stable control) device 14, and a navigation device 16, and each of the devices is connected through an interior LAN 18.

The headlamp device 10 includes a pair of left and right headlamps 20L and 20R, and an ECU 22 (beam control means) for beam control which carries out beam control for the headlamps 20L and 20R.

Each of the headlamps 20L and 20R includes a headlamp 24 provided on the front end of a vehicle 2 and a cornering lamp 26 provided adjacently to the outside in the direction of a width.

Figure 2:
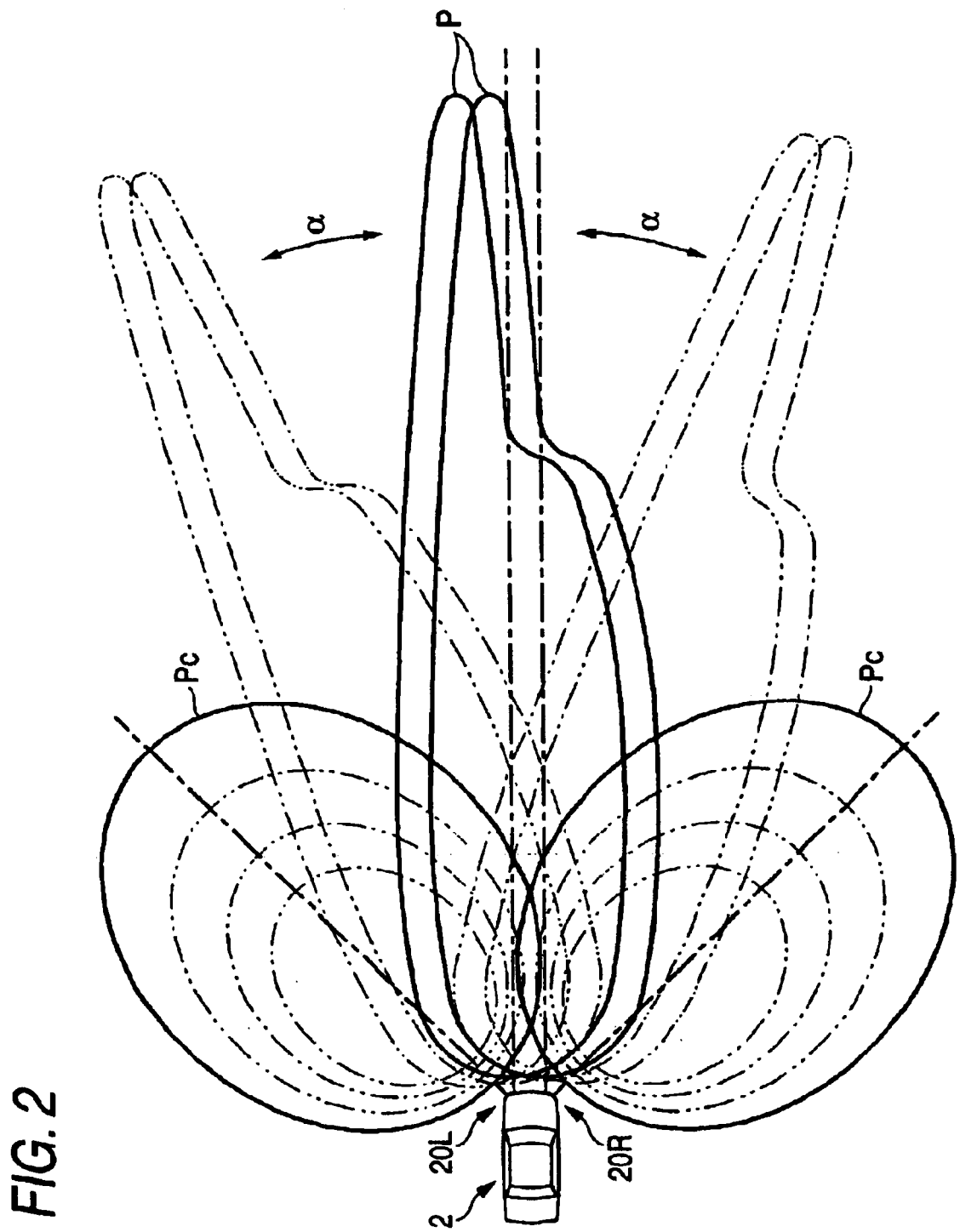
FIG. 2 is a plan view showing the light distribution pattern of a beam irradiated by the headlamp according to the embodiment.

Each headlamp 24 serves to carry out beam irradiation in the forward direction of the vehicle with a light distribution pattern P (a light distribution pattern for a low beam) shown in FIG. 2 by light reflected from a reflector 28. The direction of the beam irradiation can be changed by a predetermined angle $\alpha$ (for example, $\alpha=20$ degrees) in a transverse direction up to an angular position shown in a two-dotted chain line around the direction of the front of the vehicle shown in a solid line. In order to implement the change, the reflector 28 can be tilted in the transverse direction and the tilt is carried out by the driving operation of an actuator (ACT) 30. The actuator 30 is controlled to be driven through a driver 32 by means of the ECU 22 for beam control.

On the other hand, the cornering lamp 26 has the direction of the beam irradiation fixed at a constant angle (for example, 45 degrees on the outside in the direction of the width) in the forward direction of the vehicle, and a light distribution pattern Pc shown in FIG. 2 is formed. The cornering lamp 26 is connected to the ECU 22 for beam control through a dimmer circuit (PWM) 34 and the driver 32, and a beam intensity thereof is variable. More specifically, the light distribution pattern Pc has a size shown in a solid line when the beam intensity is the highest, and is gradually reduced as shown in a two-dotted chain line when the beam intensity is decreased by a dimmer.

The column device 12 is provided in a steering column and includes a headlamp switch 40, a turn signal lamp switch 42, a steering angle sensor 44 and a column ECU 46. The headlamp switch 40 serves to carry out the ON/OFF operation and beam switching of the headlamp 24 (switching of a high beam and a low beam), and the turn signal lamp switch 42 serves to turn ON/OFF the left and right turn signal lamps. Moreover, the steering angle sensor 44 serves to detect the steering angle (turning angle) of the vehicle 2 from the rotating angle of a steering wheel. The column ECU 46 serves to collect signals from the headlamp switch 40, the turn signal lamp switch 42 and the steering angle sensor 44 and to output the collected signals to the interior LAN 18.

The VSC device 14 includes a vehicle speed sensor 50, a yaw rate sensor which is not shown, and an ECU 52 for VSC which avoids a spin during running on a curved road and supports stable running on the curved road based on a detection signal sent from each of the sensors. It is also possible to use a detection signal sent from the steering angle sensor 44 in place of the yaw rate sensor.

The navigation device 16 includes a navigation ECU 60, a road map data DVD-ROM 62, a GPS receiver 64, a gyro sensor (a direction sensor) 66, and a display device 68. The navigation device 16 serves to fetch, into the navigation ECU 60, data transmitted from each sensor incorporated in the navigation device 16 and vehicle speed data obtained from the vehicle speed sensor 50 of the VSC device 14, to fetch information of the turn signal lamp switch 42 and the steering angle sensor 44 from the column ECU 46 of the column device 12 into the navigation ECU 60 through the interior LAN 18, and to process these information, thereby obtaining the current position and turning radius of a self-vehicle and a position to be reached after a predetermined time and outputting them to the interior LAN 18 again.

Moreover, the navigation device 16 has a route guidance function and serves to set a guide route from a current self-vehicle position to a running destination by inputting and setting the running destination by a driver and to provide information required for the driver in an image or a voice in accordance with the guide route. The navigation device 16 serves to always monitor that the vehicle 2 is running along the guide route or not during the execution of the route guidance, to re-search and set a new guide route from a current self-vehicle position to a running destination at that time when the vehicle 2 gets out of the guide route, and to provide information required for the driver in an image or a voice in accordance with the reset guide route.

The ECU 22 for beam control in the headlamp device 10 serves to collect necessary information from the column device 12, the VSC device 14 and the navigation device 16 through the interior LAN 18 and to carry out the beam control for the headlamps 20L and 20R in a control mode suitable for vehicle running situations.

The control mode has a navigation associating mode to be selected when the guide route is set by the navigation device 16 and a normal mode (a control mode other than the navigation associating mode) to be selected when the guide route is not set. Also in the case in which the guide route is set, the normal mode is selected in order to complement the navigation associating mode (which will be described later).

In the navigation associating mode, the beam control corresponding to the guide route is carried out on the premise that the vehicle 2 runs along the guide route. More specifically, the beam control is carried out by setting, to be a target position, a position that the vehicle 2 reaches after a predetermined time (for example, after 2.5 seconds).

The beam control is basically carried out by tilting the reflector 28 of the headlamp 24 from the forward direction of the vehicle into the transverse direction to set the direction of the beam irradiation toward a turning direction. If the beam irradiation over the target position cannot be carried out sufficiently by only the tilt of the headlamp 24, the cornering lamp 26 positioned in the turning direction is turned ON. At this time, when a difference in an angle between the maximum tilt angle α of the reflector 28 and the direction of the target position is increased, the beam intensity of the cornering lamp 26 is gradually increased.

Figure 3:
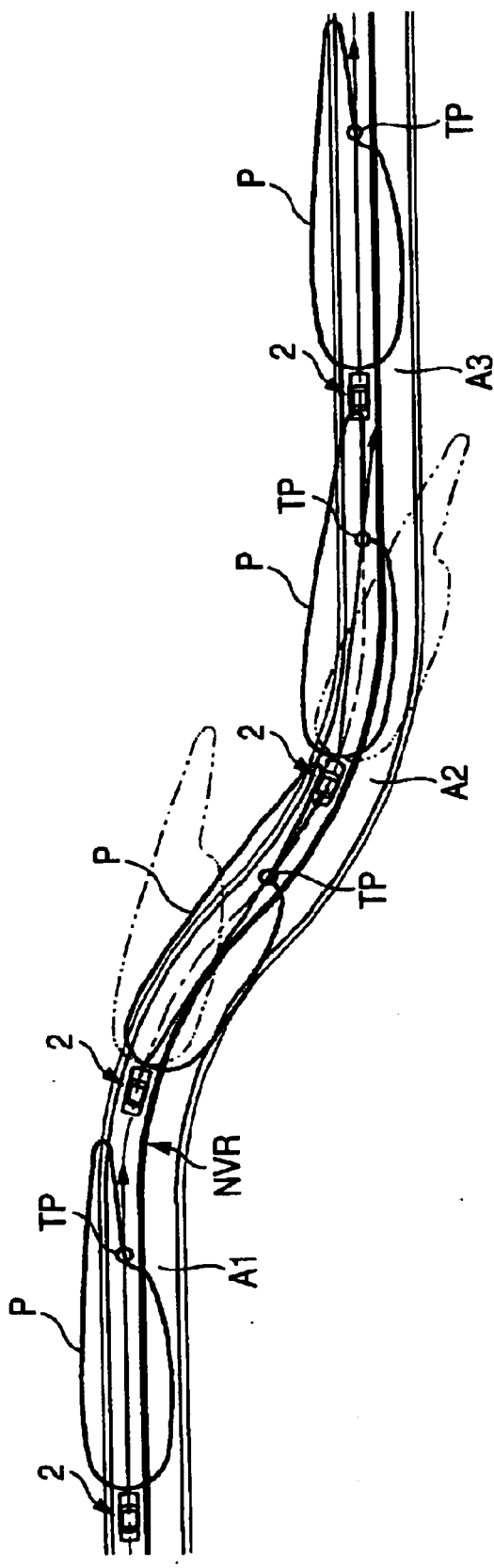
FIG. 3 is a plan view showing a road according to a specific example of beam control to be carried out in a navigation associating mode in the embodiment.

FIG. 3 is a plan view showing a road according to a specific example of the beam control to be carried out in the navigation associating mode.

In the specific example, it is assumed that the vehicle 2 running over a straight test course A1 at a speed of 50 km/h along a guide route NVR set by the navigation device 16 exactly runs over a straight test course A3 through an S-shaped test course A2 along the guide route NVR.

In FIG. 3, a point TP shown a head of the vehicle 2 indicates a position that the vehicle 2 is to reach after 2.5 seconds (a position that the self-vehicle is to reach), and the beam control is carried out by setting, as a target position, the position TP that the self-vehicle is to reach. Since the target position TP is placed in the forward direction of the vehicle over the straight test course A1, the light distribution pattern P is also turned in the forward direction of the vehicle and is shifted transversely in the forward direction of the vehicle over the S-shaped test course A2. Therefore, the light distribution pattern P is also shifted transversely in the forward direction of the vehicle shown in a two-dotted chain line. The light distribution pattern P shown in FIG. 3 is the synthetic light distribution pattern of a pair of left and right headlamps 24 (and so forth).

On the other hand, the normal mode includes a road shape corresponding mode for carrying out beam control based on the road shape data in the forward part of the vehicle which are obtained by the navigation device 16, and a turning angle corresponding mode for carrying out the beam control based on steering angle data (turning angle data) transmitted from the steering angle sensor 44. Furthermore, the road shape corresponding mode includes a road following control mode for carrying out beam irradiation suitable for running following a road and an intersection control mode for carrying out beam irradiation suitable for turn running at an intersection.

The road following control mode serves to enhance a visibility in the direction of advance of the vehicle in the case in which it is assumed that the vehicle 2 runs following the test course. In the road following control mode, the beam control is carried out by setting, as a target position, a position that the vehicle 2 is to reach after a predetermined time (for example, after 2.5 seconds) in the same manner as the navigation associating mode. The contents of the beam irradiation of the headlamp 24 and the cornering lamp 26 to be carried out for the beam control in the road following control mode are the same as those in the case of the navigation associating mode.

Figure 4:
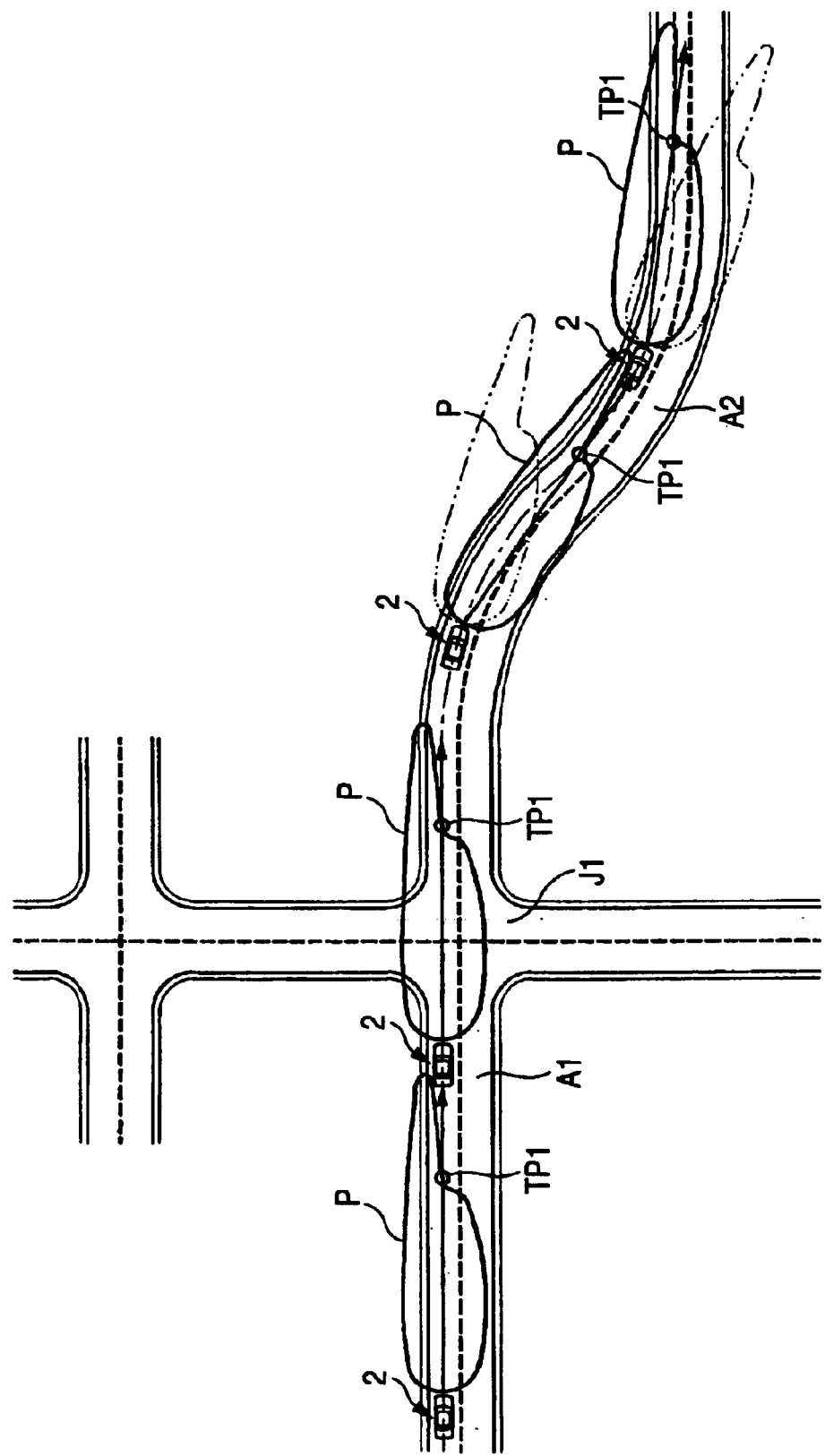
FIG. 4 is a plan view showing a road according to a specific example of beam control to be carried out in a road following control mode to be a normal mode in the embodiment.

FIG. 4 is a plan view showing a road according to a specific example of the beam control to be carried out in the road following control mode.

In the specific example, it is assumed that the vehicle 2 runs over the straight test course A1 at a speed of 50 km/h and advances straight without a right or left turn at a next intersection J1, and then runs along the S-shaped test course A2.

In FIG. 4, a point TP1 shown ahead of the vehicle 2 is a position that the vehicle 2 is to reach after 2.5 seconds (that is, a target position for the beam control). Since the target position TP1 is turned in the forward direction of the vehicle over the straight test course A1, the light distribution pattern P is also turned in the forward direction of the vehicle and is shifted transversely in the forward direction of the vehicle over the S-shaped test course A2. Therefore, the light distribution pattern P is also shifted from the forward direction of the vehicle shown in a two-dotted chain line into a transverse direction.

The intersection control mode serves to enhance a visibility in the direction of the advance of the vehicle by previously carrying out the beam irradiation in the turning direction in a stage before an arrival at the intersection in the case in which it is apparent that the vehicle 2 runs with a turn at the intersection provided in the forward part of the test course. In the intersection control mode, the beam control is carried out by setting, as a target position, the position that the vehicle 2 is to reach after a predetermined time (for example, after 2.5 seconds) in the case in which it is decided that the vehicle 2 runs with a turn at the intersection provided ahead of the test course when the vehicle 2 approaches the intersection to some extent. The contents of the beam irradiation of the headlamp 24 and the cornering lamp 26 to be carried out for the beam control in the intersection control mode are the same as those in the navigation associating mode.

FIG. 5 is a plan view showing a road according to a specific example of the beam control to be carried out in the intersection control mode.

In the specific example, it is assumed that the vehicle 2 running along the test course A1 at a speed of 30 km/h makes a left turn at a next intersection J1 and enters a test course B, and makes a right turn at a next intersection J2 and enters a test course C.

As shown, when the vehicle 2 is present in a sufficiently separated position from the intersection J1 of the test course A1 toward this side (the left side), the beam control is still carried out in the road following control mode. When the vehicle 2 approaches the intersection J1 to some extent so that the turn signal lamp is operated, the intersection control mode is set.

In the drawing, a point TP2 shown ahead of the vehicle 2 is a position that the vehicle 2 is to reach after 2.5 seconds in the intersection control mode (that is, the target position of the beam control). When the vehicle 2 is present in a separated position from the intersection J1 of the test course A1 toward this side (the left side), the target position TP2 is placed in the forward direction of the vehicle 2 so that the light distribution pattern P is also turned in the forward direction of the vehicle 2. When the vehicle 2 approaches the intersection J1, the target position TP2 is positioned on a left turn running line (a line shown in a one-dotted chain line in the drawing) in the intersection J1 so that the light distribution pattern P is also shifted toward the left side in the forward direction of the vehicle shown in a two-dotted chain line. Since the target position TP2 is shifted leftwards along the left turn running line in the intersection J1, the direction of the light distribution pattern P is also changed leftwards correspondingly. When the direction of the target position TP2 exceeds a maximum tilt angle α of the reflector 28, the direction of the light distribution pattern P cannot follow the target position TP2. Therefore, the cornering lamp 26 on the left side of the vehicle is turned ON to form a light distribution pattern Pc. Consequently, irradiation is carried out in the leftward direction. The beam intensity of the cornering lamp 26 is low at first and is gradually increased when a difference in an angle between the maximum tilt angle α of the reflector 28 and the target position T2 is increased.

At time of a right turn in a next intersection J2, the same beam control is carried out. During the right turn, a turning radius R of the right turn running line in the intersection J2 is increased. When the beam intensity of the cornering lamp 26 is gradually increased with an increase in the difference in an angle between the maximum tilt angle α of the reflector 28 and the target position T2, the beam irradiation over the target position T2 becomes insufficient. For this reason, the beam intensity is set to have a maximum value immediately after the cornering lamp 26 is started to be turned ON.

When the vehicle 2 reaches the intersection J1 or the intersection J2 and actually turns in the same intersection, the beam control is carried out in the turning angle corresponding mode in place of the intersection control mode.

In the turning angle corresponding mode, when a steering operation is carried out, the reflector 28 of the headlamp 24 is turned in the turning direction of the vehicle depending on a steering angle and the cornering lamp 26 positioned in the turning direction of the vehicle 2 is turned ON. In that case, the tilt angle of the reflector 28 of the headlamp 24 and the beam intensity of the cornering lamp 26 are gradually increased when the steering angle is increased.

In the case in which a transition is carried out from the intersection control mode to the turning angle corresponding mode, the beam irradiation is carried out in the turning angle corresponding mode to maintain the beam irradiation state in the intersection control mode such that the beam irradiation is not discontinuous (that is, the light distribution pattern P of the headlamp 24 and the light distribution pattern Pc of the cornering lamp 26 are not changed rapidly).

Figure 6A:
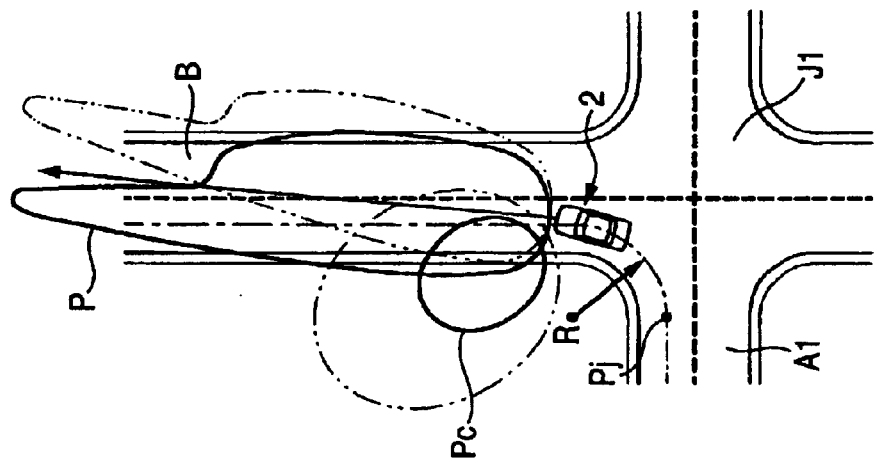
FIGS. 6A, 6B and 6C are plan views showing a road according to a specific example of beam control to be carried out in a turning angle corresponding mode to be the normal mode in the embodiment (No. 1)
Figure 6B:
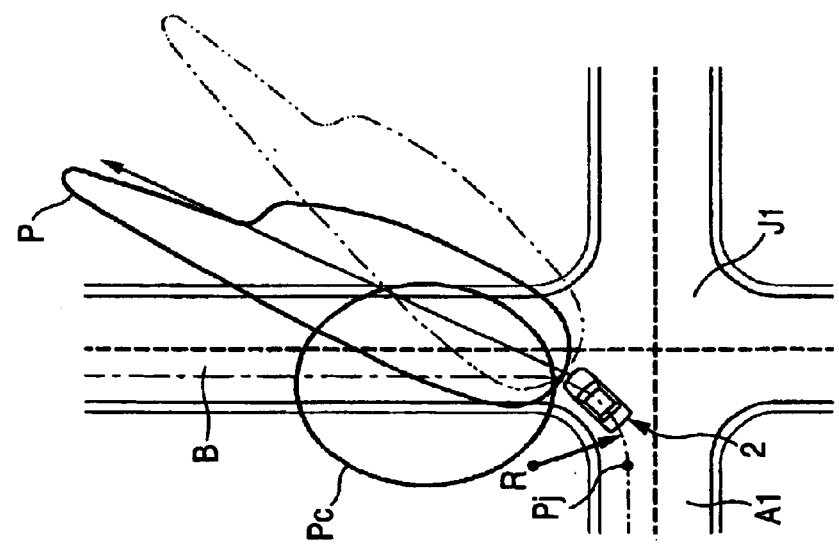
Figure 6C:
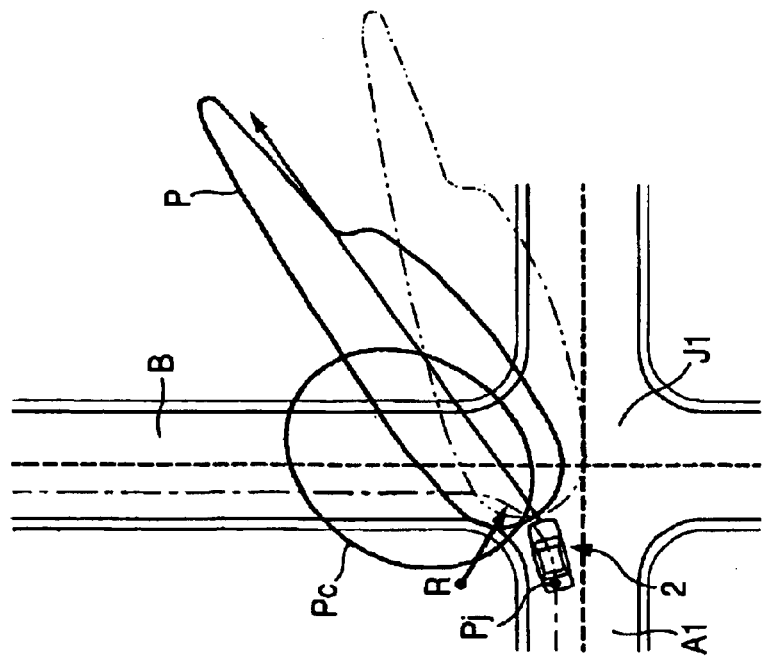
Figure 7A:
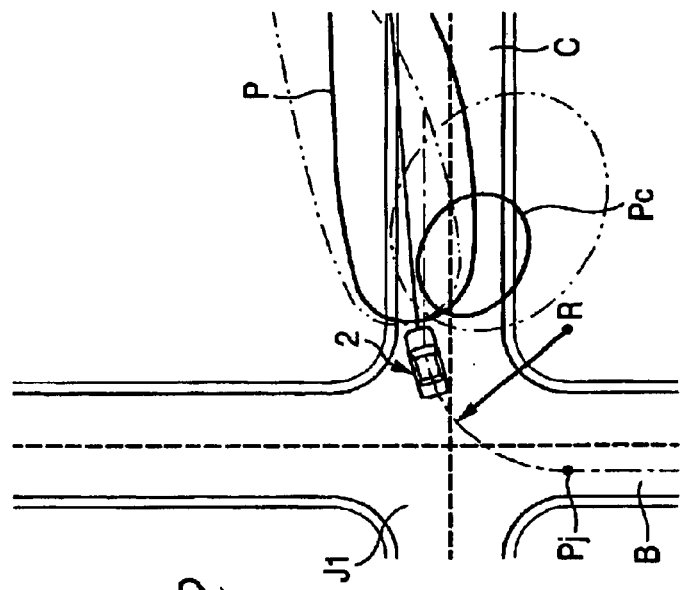
FIGS. 7A, 7B and 7C are plan views showing a road according to a specific example of the beam control to be carried out in the turning angle corresponding mode to be the normal mode in the embodiment.
Figure 7B:
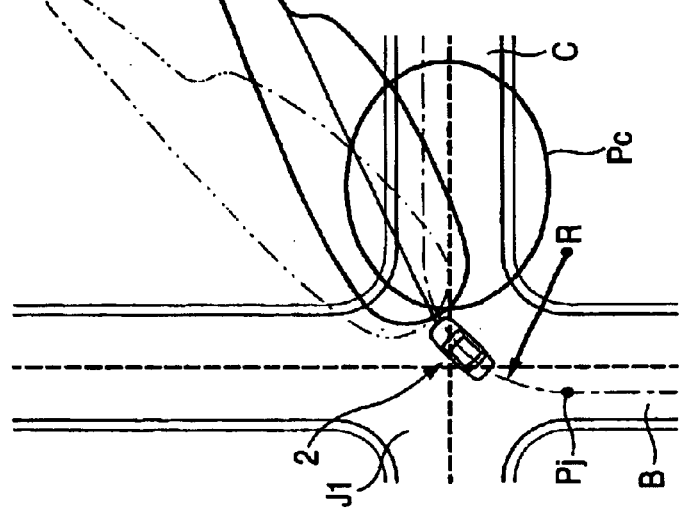
Figure 7C:
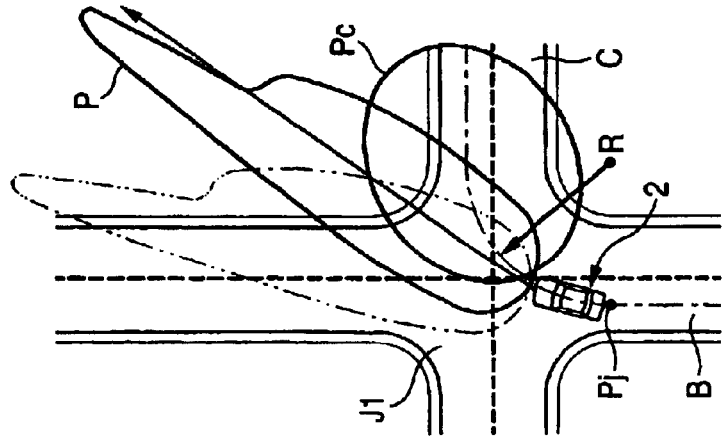

FIGS. 6 and 7 are plan views showing a road according to a specific example of beam control to be carried out in the turning angle corresponding mode.

FIG. 6 assumes that the vehicle 2 makes a left turn at the intersection J1 and FIG. 7 assumes that the vehicle 2 makes a right turn at the intersection J2.

As shown in these drawings, before the steering angle is maximized by a steering operation in a positive direction during the turn running at the intersections J1 and J2, the beam irradiation state in the intersection control mode is taken over to maintain the tilt angle of the reflector 28 of the headlamp 24 and the beam intensity of the cornering lamp 26 to have maximum values (that is, the transverse deflection angle of the light distribution pattern P is maximized and the size of the light distribution pattern Pc is maintained to be a maximum). When the steering angle is decreased by a steering operation in a negative direction, the tilt angle of the reflector 28 of the headlamp 24 and the beam intensity of the cornering lamp 26 are gradually decreased.

Figure 8:
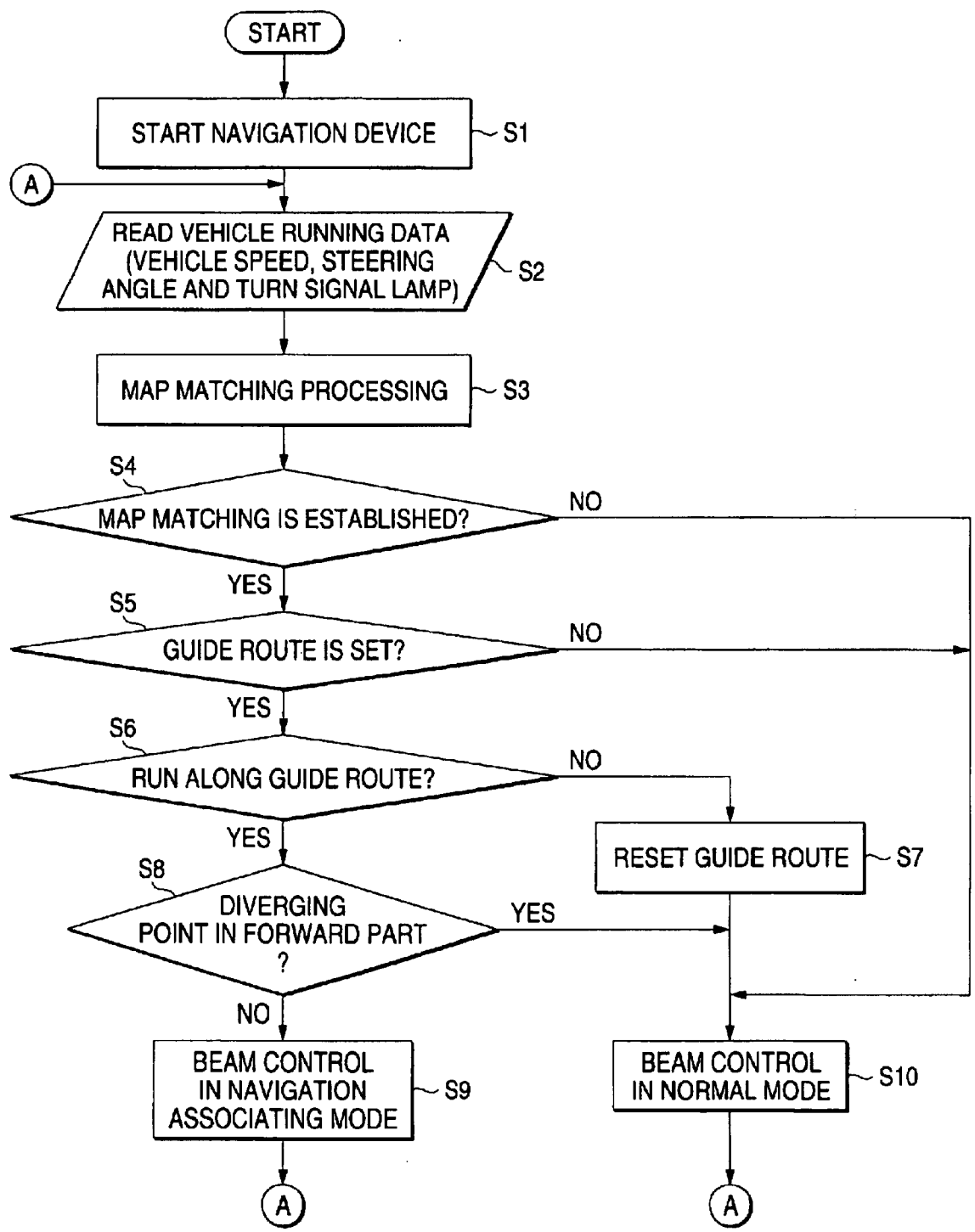
FIG. 8 is a flow chart showing the contents of the beam control to be carried out in the embodiment.

Next, the contents of the beam control to be carried out in the headlamp system for a vehicle according to the embodiment will be described based on a flow chart of FIG. 8.

First of all, the navigation device 16 is started (S1) and road map data are read in the navigation ECU 60 from the road map data CD-ROM 62, and vehicle running data (vehicle speed data transmitted from the vehicle speed sensor 50, steering angle data transmitted from the steering angle sensor 44 and data on the operation state of the turn signal lamp which are transmitted from the turn signal lamp switch 42) are then read (S2).

In the navigation ECU 60, subsequently, map matching is carried out based on position data transmitted from the GPS receiver 64 and the direction data transmitted from the gyro sensor 66, and the road map data (S3).

At this time, if the map matching is not established (the test course of the vehicle 2 cannot be recognized) (NO in S4), the ECU 22 for beam control carries out the beam control for the headlamps 20L and 20R in a normal mode (S10).

On the other hand, if the map matching is established (YES in S4), it is then ascertained whether or not a guide route to reach a running destination is set (S5) If the guide route is not set, the ECU 22 for beam control carries out the beam control for the headlamps 20L and 20R in the normal mode (S10). On the other hand, if the guide route is set, it is decided whether or not the vehicle 2 runs along the guide route (S6).

If the vehicle 2 runs along the guide route (YES in S6) and an intersection is not present between a current self-vehicle position and a position that a self-vehicle is to reach after a predetermined time (for example, after 5 seconds) in the guide route (NO in S8), the beam control is carried out in a navigation associating mode (S9). On the other hand, if the vehicle 2 does not run along the guide route (NO in S6), a guide route between a current self-vehicle position and a running destination at that time is re-searched and is reset to be a new guide route (S7), and the beam control is carried out in the normal mode until the resetting is completed (S10). Also in the case in which the vehicle 2 runs along the guide route, moreover, the beam control is carried out in the normal mode (S10) when an intersection is present between the current self-vehicle position and the position that the self-vehicle is to reach after a predetermined time in the guide route (YES in S8).

The processings at and after the step S2 are repeated again and the beam control is carried out in either the navigation associating mode or the normal mode.

Figure 9:
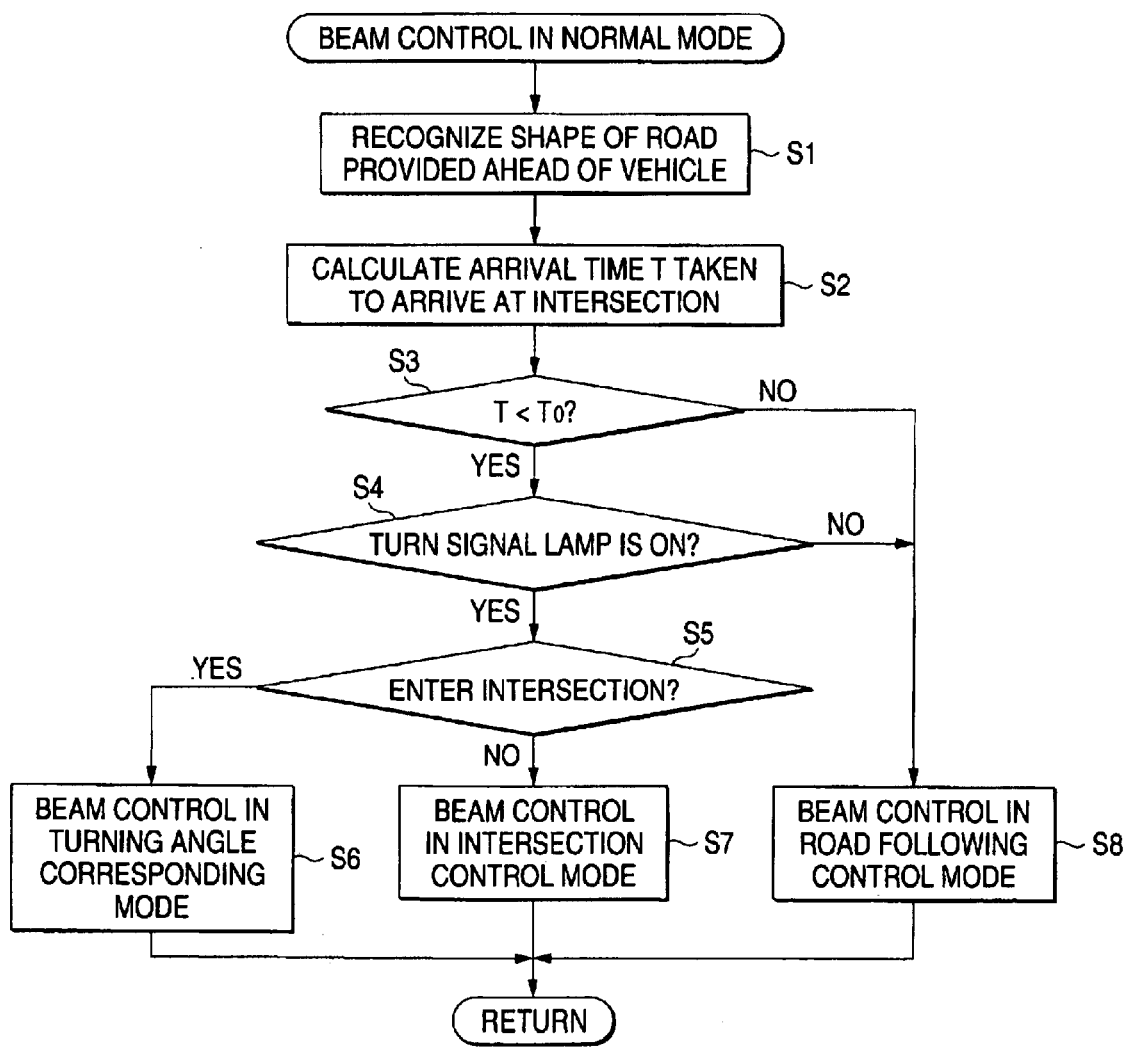
FIG. 9 is a flow chart showing the contents of beam control to be carried out in the normal mode according to the embodiment.

Next, the contents of the beam control to be carried out in the normal mode will be described with reference to a flow chart of FIG. 9.

First of all, the recognition of the shape of a road provided ahead of the vehicle which is required for beam control in a road shape corresponding mode (a road following control mode and an intersection control mode) is carried out (S1). More specifically, the navigation device 16 reads a current vehicle position, the type of a road and the number of lanes in an advance path (a test course at the present time), the position of an intersection (node) present in the forward part of the advance path and the number of intersecting paths (links) at the intersection.

Next, an arrival time T required for causing the vehicle 2 to arrive at a next intersection positioned in the forward part of the advance path from a current position is calculated (S2). The calculation is carried out based on data on the shape of the road provided in the forward part of the vehicle and data on an actual vehicle speed. It is decided whether or not the arrival time T is less than a set time To (for example, a proper value of To=2.5 to 3.5 seconds) (S3). The reason why To is set to have a value of approximately 2.5 to 3.5 seconds is that the operation of the turn signal lamp is completed and a decelerating action is started within such a time if a course is to be changed at the intersection.

If the arrival time T is set to T≧To, it is also possible to decide that the vehicle 2 still advances following the course for a while. Therefore, the beam control is carried out in the road following control mode (S11). On the other hand, if the arrival time T is set to T<To, it is checked that the turn signal lamp is operated or not (S4). If the turn signal lamp switch 42 is not turned ON, the beam control is carried out continuously in the road following control mode (S8). On the other hand, if the turn signal lamp switch 42 is turned ON, the beam control is carried out in the intersection control mode on the assumption that the course is to be changed at a next intersection (S7). After the vehicle 2 enters the intersection (YES in S5), the beam control is carried out in the turning angle corresponding mode (S6). Whether the vehicle 2 enters the intersection is decided depending on the decision whether the arrival time T taken for arriving at the intersection is set to T≦0.

FIGS. 10 to 13 are plan views showing a road according to a specific example of the beam control to be carried out in the headlamp system for a vehicle according to the embodiment.

Figure 10:
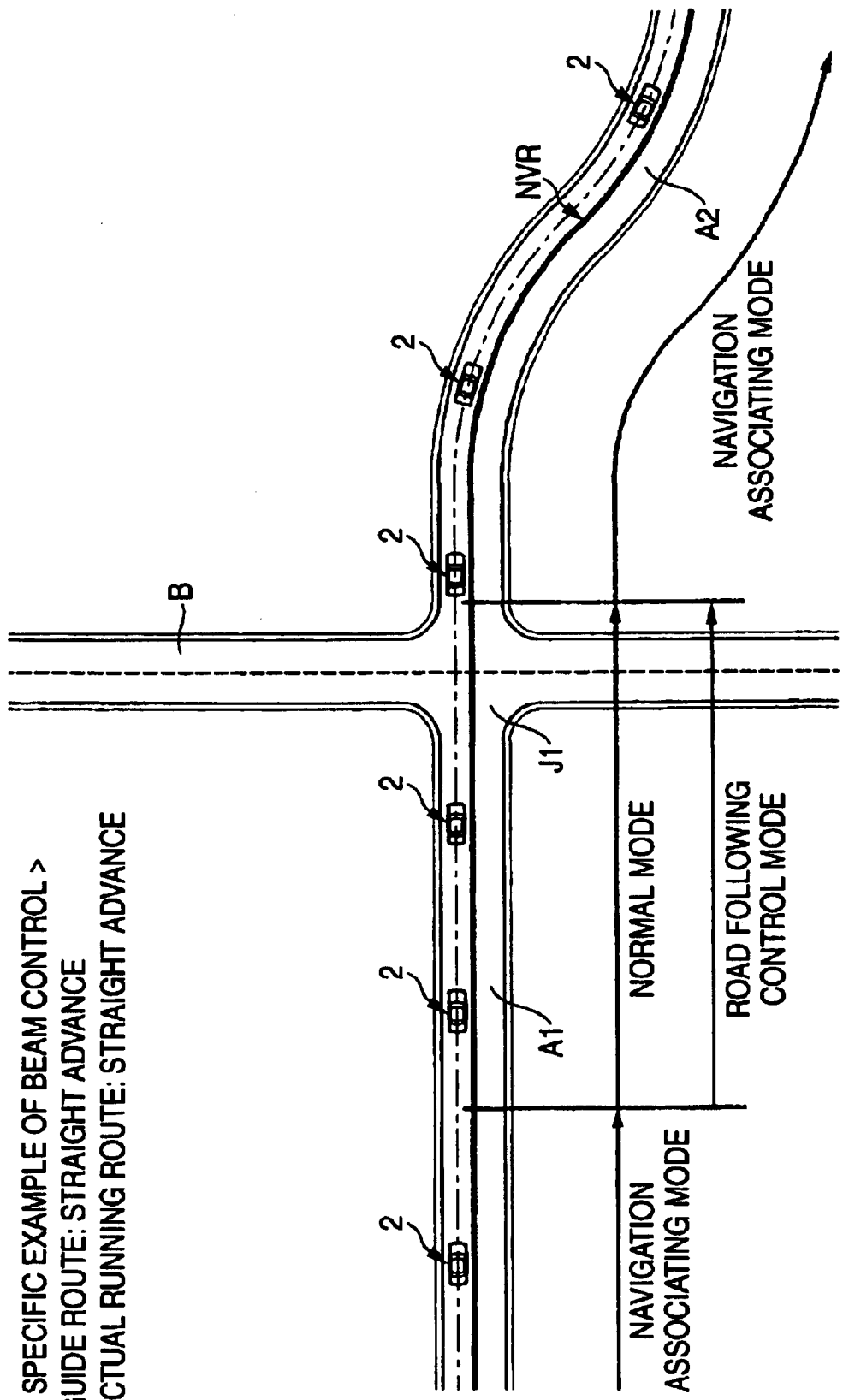
FIG. 10 is a plan view showing a road according to a specific example of beam control to be carried out in the embodiment (No. 1)

FIG. 10 is a view showing a control mode in the case in which the vehicle 2 running over the test course A1 along the guide route NVR set by the navigation device 16 straight runs according to the guide route NVR without making right and left turns at the intersection J1 when the guide route NVR straight advances from the straight test course A1 toward the S-shaped test course A2 through the intersection J1.

In this case, as shown in FIG. 10, when the vehicle 2 running along the test course A1 approaches the intersection J1 to some extent, the control mode is changed from the navigation associating mode into the normal mode. When the vehicle 2 then passes through the intersection J1, the control mode is changed into the navigation associating mode again. At this time, the vehicle 2 continuously runs along the guide route NVR. Therefore, the re-search of the guide route NVR is not required. Accordingly, the switching from the normal mode to the navigation associating mode is carried out instantly when passing through the intersection J1.

In this case, the turn signal lamp is not operated on this side of the intersection J1. Therefore, only the road following control mode is selected as the normal mode.

Figure 11:
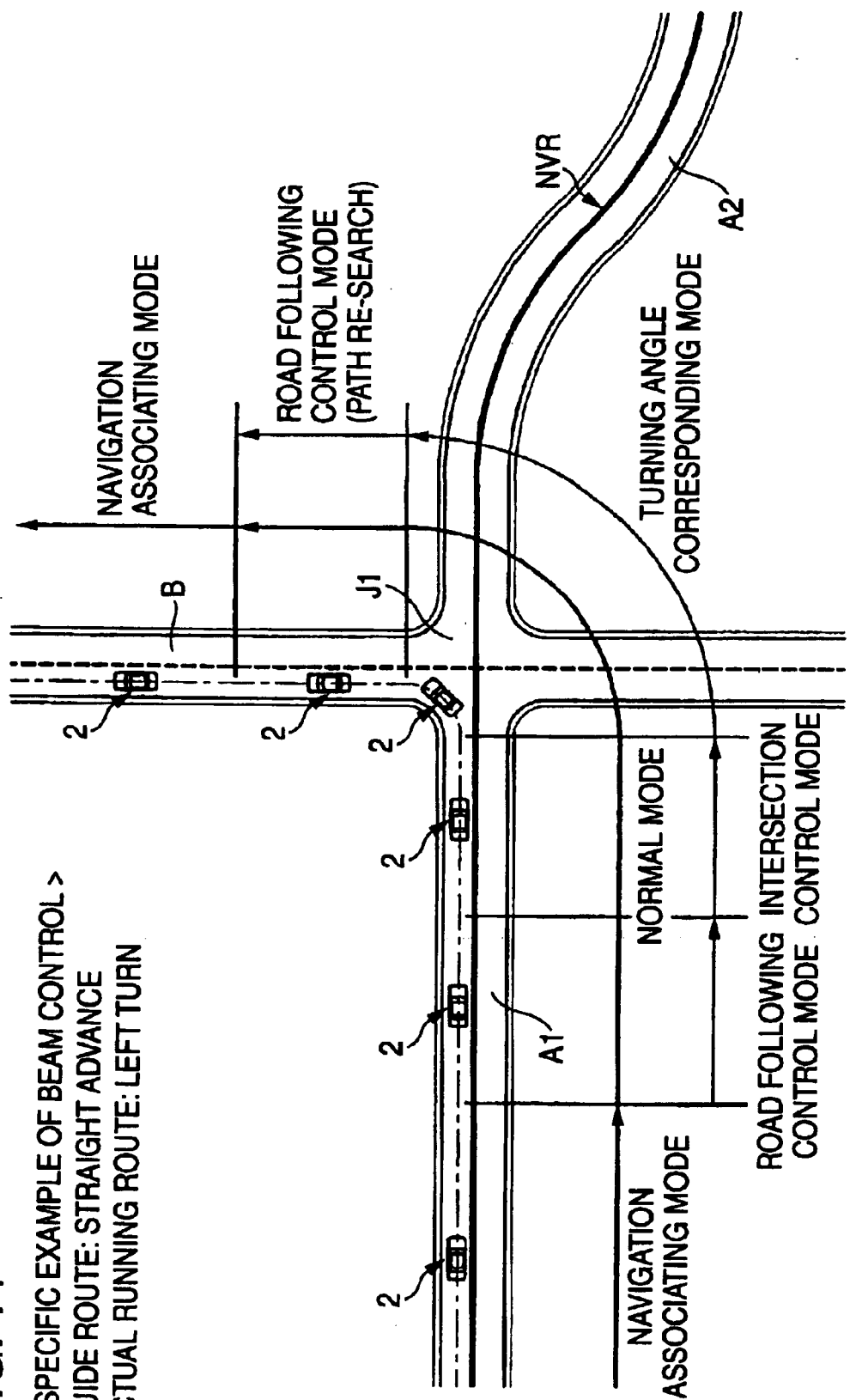
FIG. 11 is a plan view showing a road according to a specific example of the beam control to be carried out in the embodiment (No. 2)

FIG. 11 is a view showing the control mode in the case in which the vehicle 2 running over the test course A1 along the guide route NVR set by the navigation device 16 makes a left turn at the intersection J1 and enters a test course B when the guide route NVR straight advances from the straight test course A1 toward the S-shaped test course A2 through the intersection J1.

Also in this case, as shown in FIG. 11, when the vehicle 2 running along the test course A1 approaches the intersection J1 to some extent, the control mode is changed from the navigation associating mode into the normal mode. When the vehicle 2 then passes through the intersection J1, the control mode is changed into the navigation associating mode again. In this case, when the vehicle 2 makes a left turn at the intersection J1, it gets out of the guide route NVR. Therefore, the re-search of the guide route NVR is required. For this reason, the state of the normal mode is maintained without switching into the navigation associating mode while the re-search is carried out.

In this case, first of all, the road following control mode is selected during the switching from the navigation associating mode into the normal mode. When the vehicle 2 approaches the intersection J1 to operate the turn signal lamp, the intersection control mode is selected. After the vehicle 2 enters the intersection J1, the turning angle corresponding mode is selected. Furthermore, the road following control mode is selected before the re-search of the guide route NVR is completed after the vehicle 2 enters the test course B.

FIG. 12 is a view showing the control mode in the case in which the vehicle 2 running over the test course A1 along the guide route NVR set by the navigation device 16 makes a left turn at the intersection J1 and runs according to the guide route NVR when the guide route NVR makes a left turn at the intersection J1 from the test course A1 and enters the test course B.

In this case, as shown in FIG. 12, when the vehicle 2 running along the test course A1 approaches the intersection J1 to some extent, the control mode is changed from the navigation associating mode into the normal mode. When the vehicle 2 then passes through the intersection J1, the control mode is changed into the navigation associating mode again. At this time, the vehicle 2 continuously runs along the guide route NVR. Therefore, the re-search of the guide route NVR is not required. Accordingly, the switching from the normal mode into the navigation associating mode is carried out instantly when passing through the intersection J1.

In this case, first of all, the road following control mode is selected during the switching from the navigation associating mode into the normal mode. When the vehicle 2 approaches the intersection J1 to operate the turn signal lamp, the intersection control mode is selected. After the vehicle 2 enters the intersection J1, the turning angle corresponding mode is selected.

FIG. 13 is a view showing the control mode in the case in which the vehicle 2 running over the test course A1 along the guide route NVR set by the navigation device 16 straight runs without making right and left turns at the intersection J1 when the guide route NVR makes a left turn at the intersection J1 from the test course A1 and advances toward the test course B.

Also in this case, as shown in FIG. 13, when the vehicle 2 running along the test course A1 approaches the intersection J1 to some extent, the control mode is changed from the navigation associating mode into the normal mode. When the vehicle 2 then passes through the intersection J1, the control mode is changed into the navigation associating mode again. In this case, when the vehicle 2 straight advances through the intersection J1, it gets out of the guide route NVR. Therefore, the re-search of the guide route NVR is required. For this reason, the state of the normal mode is maintained without switching into the navigation associating mode while the re-search is carried out.

In this case, the turn signal lamp is not operated on this side of the intersection J1. Therefore, only the road following control mode is selected as the normal mode.

As described above in detail, the headlamp system for a vehicle according to the embodiment comprises the ECU 22 for beam control to control beams irradiated by the headlamps 20L and 20R and the navigation device 16 having the route guidance function. In such a state that the self-vehicle runs along the guide route, the navigation ECU 60 of the navigation device 16 carries out the beam control in the navigation associating mode corresponding to the guide route in the case in which an intersection is not present between a current self-vehicle position and a position that a self-vehicle is to reach after a predetermined time in the guide route, while it carries out the beam control in the normal mode in the case in which the intersection is present before the position that the self-vehicle is to reach. Therefore, the following functions and effects can be obtained.

More specifically, when the self-vehicle runs along the guide route, the beam control is carried out in the navigation associating mode if the intersection is not present in a forward part over the guide route for a while. Therefore, it is possible to properly carry out beam irradiation over the road provided a head of the vehicle without requiring a complicated calculation for the beam control (without applying a great burden to the ECU 22 for beam control). On the other hand, when the self-vehicle runs along the guide route, the beam control is carried out in the normal mode if the intersection is present ahead of the vehicle. Therefore, even if the self-vehicle gets out of the guide route when passing through the intersection, the beam control itself is carried out continuously. Consequently, it is possible to properly carry out the beam irradiation over the road provided ahead of the vehicle.

According to the embodiment, thus, the beam control utilizing the route guidance function of the navigation device 16 can be carried out, and furthermore, predetermined beam control can be performed also in the case in which the self-vehicle gets out of the guide route.

In the embodiment, if the self-vehicle gets out of the guide route when passing through the intersection in such a state as to run along the guide route, the beam control is carried out in the normal mode until the guide route is re-searched by the navigation device 16 and a new guide route is set, and the beam control is carried out in the navigation associating mode after the new guide route is set. Therefore, proper beam control can be carried out continuously, and furthermore, the beam control can be performed in the navigation associating mode as much as possible. Consequently, it is possible to relieve the burden of the ECU 22 for beam control.

In the embodiment, moreover, the normal mode includes the road shape corresponding mode for carrying out the beam control corresponding to the shape of the road provided ahead of the vehicle. Also in the case in which the self-vehicle gets out of the guide route, therefore, it is possible to properly carry out the beam irradiation over the road provided ahead of the vehicle in almost the same precision as the beam control in the navigation associating mode.

In the embodiment, furthermore, the beam control in the navigation associating mode is carried out by setting, as the target position, the position that the self-vehicle is to reach after a predetermined time in the guide route. Therefore, the road provided ahead of the vehicle can be irradiated sufficiently. In the embodiment, moreover, the beam control in the road shape corresponding mode is also carried out by setting, as the target position, the position that the self-vehicle is to reach after a predetermined time in the self-vehicle test course. Even if the self-vehicle gets out of the guide route, therefore, the road provided ahead of the vehicle can be irradiated sufficiently.

In the embodiment, there has been described the case in which the light distribution pattern P formed by the beam irradiation from the headlamp 24 of each of the headlamps 20L and 20R is the light distribution pattern for a low beam. Also in the case in which the beam irradiation is to be carried out with the light distribution pattern for a high beam by beam switching, it is possible to obtain the same functions and effects as those in the embodiment by carrying out the same beam control as that in the embodiment.

In the embodiment, furthermore, there has been described the case in which each of the headlamps 20L and 20R includes the headlamp 24 capable of tilting the reflector 28 in a transverse direction and the cornering lamp 26 capable of carrying out dimming. It is a matter of course that the structures of other lighting tools can also be employed. For example, also in the case in which there are employed the structure of a lighting tool including a headlamp capable of changing a beam irradiation range and a cornering lamp capable of changing the direction of beam irradiation, the structure of a lighting tool including other lamps in addition to a headlamp and a cornering lamp, the structure of a lighting tool including a headlamp and a fog lamp, and the structure of a lighting tool adding, to an ordinary headlamp, a special light distribution variable lamp for changing light distribution depending on running situations, it is possible to obtain the same functions and effects as those in the embodiment by properly carrying out the beam control in the structure of each of the lighting tools.

What is claimed is:

1. A headlamp system for a vehicle comprising:

a headlamp for irradiating a forward part of the vehicle;

beam control means for controlling a beam irradiated by the headlamp; and a navigation device for setting a guide route from a current self-vehicle position to a running destination, wherein, in such a state that a self-vehicle runs along the guide route, the beam control means carries out the beam control in a navigation associating mode corresponding to the guide route if an intersection is not present between the current self-vehicle position and a position that the self-vehicle is to reach after a predetermined time in the guide route, and carries out the beam control in a control mode other than the navigation associating mode until the self-vehicle passes through at least an intersection present before the position that the self-vehicle is to reach if any.

2. The headlamp system for a vehicle according to claim 1, wherein if the self-vehicle gets out of the guide route when passing through the intersection in such a state as to run along the guide route, the beam control is carried out in the control mode other than the navigation associating mode until the guide route is re-searched by the navigation device and a new guide route is set, and the beam control is carried out in the navigation associating mode after the new guide route is set.

3. The headlamp system for a vehicle according to claim 1, wherein the control mode other than the navigation associating mode includes a road shape corresponding mode for carrying out the beam control depending on a shape of a road provided ahead of the vehicle.

4. The headlamp system for a vehicle according to claim 1, wherein a position that the vehicle reaches after a predetermined time is used as a target position in the beam control under the navigation associating mode.

5. The headlamp system for a vehicle according to claim 1, wherein the control mode other than the navigation associating mode includes a turning angle corresponding mode for carrying out the beam control based on steering angle data transmitted from a steering angle sensor.

6. The headlamp system for a vehicle according to claim 3, wherein the road shape corresponding mode includes an intersection control mode for previously carrying out the beam irradiation in the turning direction in a stage before an arrival at the intersection.

* * * * *